(No Model.) 2 Sheets—Sheet 1.
S. C. WARNER.
FRUIT WASHING MACHINE.
No. 496,023. Patented Apr. 25, 1893.
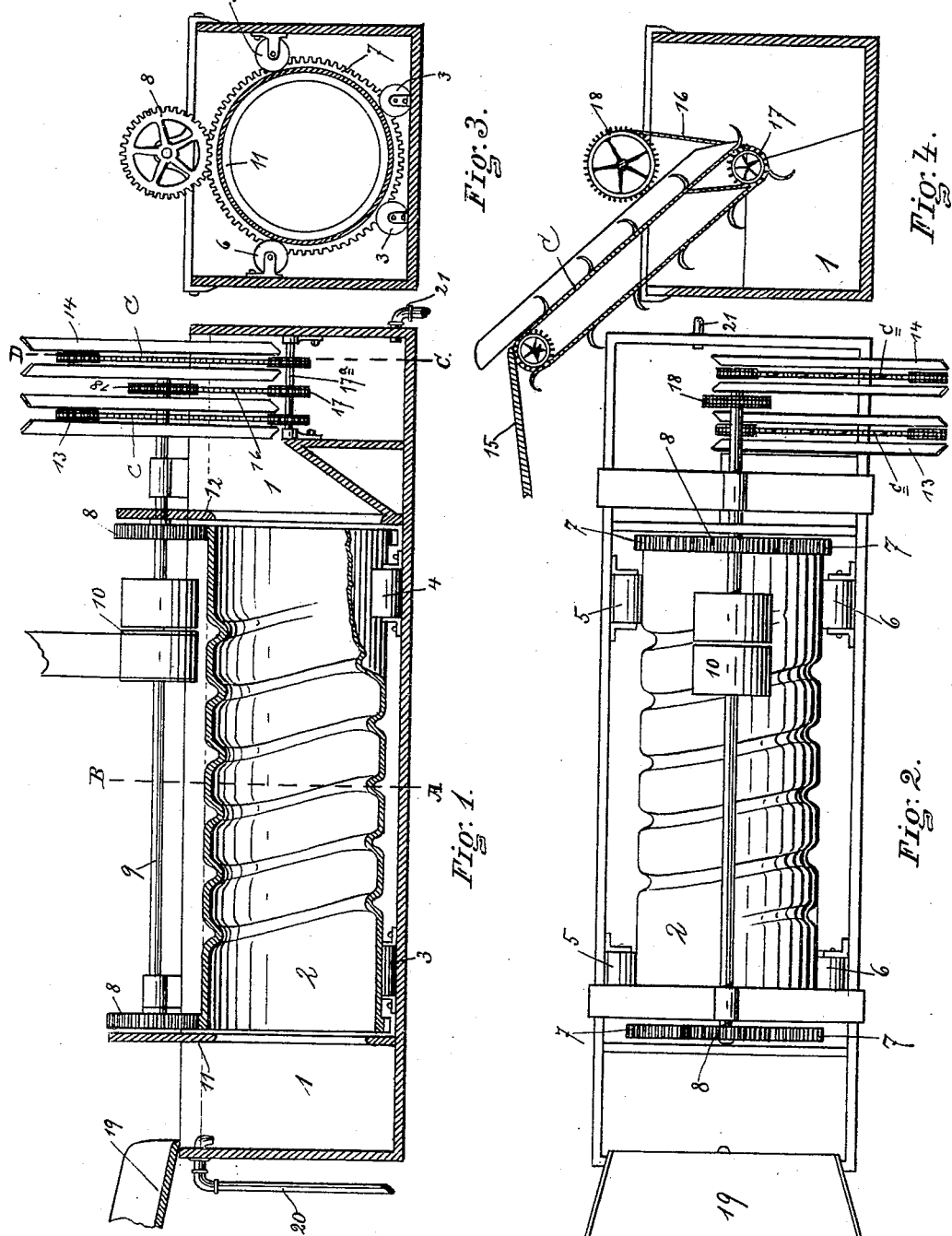
WITNESSES
Rich. A. George.
N. D. Ward.
INVENTOR.
Samuel Campbell Warner
By Risley & Robinson
Attys.

(No Model.) 2 Sheets—Sheet 2.
S. C. WARNER.
FRUIT WASHING MACHINE.
No. 496,023. Patented Apr. 25, 1893.
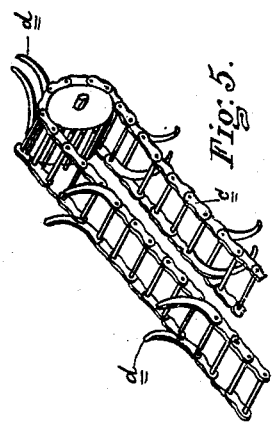
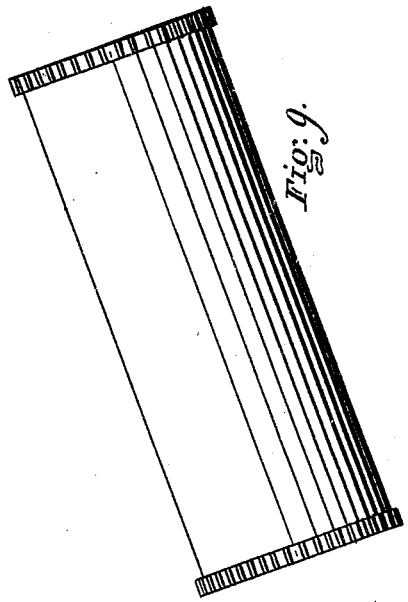
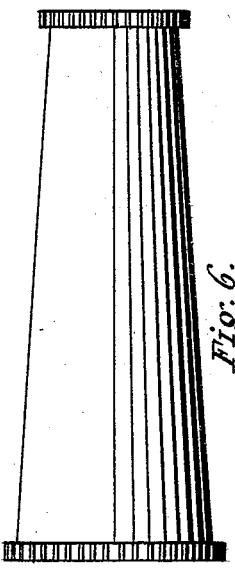
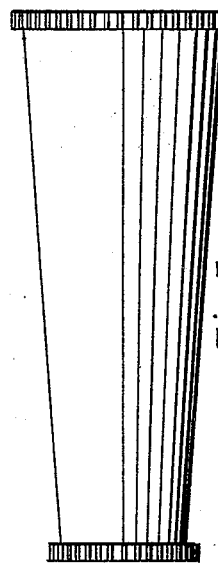
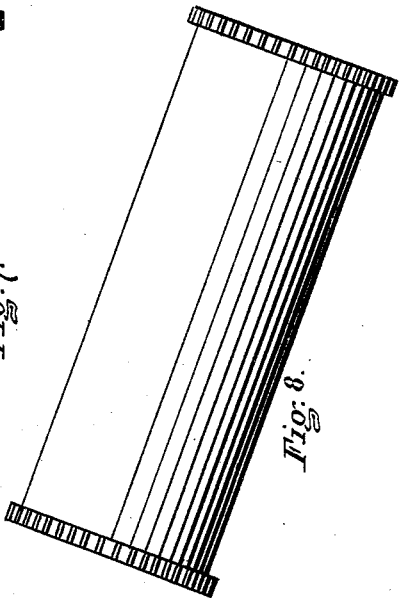
WITNESSES.
Rich. A. George
N. D. Ward
INVENTOR.
Samuel Campbell Warner
By Risley & Robinson
Attys.

UNITED STATES PATENT OFFICE.

SAMUEL CAMPBELL WARNER, OF NEW YORK MILLS, NEW YORK.

FRUIT-WASHING MACHINE.

SPECIFICATION forming part of Letters Patent No. 496,023, dated April 25, 1893.

Application filed June 27, 1892. Serial No. 438,069. (No model.)

*To all whom it may concern:*

Be it known that I, SAMUEL CAMPBELL WARNER, of New York Mills, in the county of Oneida and State of New York, have invented certain new and useful Improvements in Fruit-Washing Machines; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to an improvement in washing machines, more particularly intended for washing oranges or other fruits.

In the drawings which accompany and form a part of this specification and in which similar letters and figures of reference refer to corresponding parts in the several views, Figure 1 shows my improved washer mostly in vertical, central, longitudinal section. Fig. 2 shows a plan view of the washer. Fig. 3 shows section taken on a line with A, B of Fig. 1. Fig. 4 shows a section taken on line C, D of Fig. 1. Fig. 5 shows in detail, a portion of the fruit carrier or elevator. Figs. 6, 7, 8, and 9 show modified forms of cylinders which I may use in the machine.

Referring more particularly to the reference numerals marked on the drawings in a more particular description of the device, 1 indicates the tank in which the working parts of the machine are located and which contains the washing fluid.

2 is a rotating cylinder mounted upon rollers, as 3 and 4 at either end and provided with guiding or steadying rollers as 5 and 6 engaging the sides of the cylinder. The cylinder may be spirally threaded or corrugated, as shown in Fig. 1 or tapered as shown in Figs. 6 and 7, or mounted on an incline, as shown in Figs. 8 and 9, to facilitate the feeding of the fruit through the machine as hereinafter described. The cylinder is provided on either end with cog gear teeth, as shown at 7, in which are meshed a pinion, as 8, on either end; which pinions are mounted on a shaft 9, to which power is applied by means of band wheels 10, by belt, or by any other suitable means.

Each end of the cylinder 2 is open, and adjacent to each end in the tank, are provided partitions 11 and 12, provided with circular openings nearly corresponding in size to the internal diameter of the cylinder.

In the portion of the tank at the discharge end of the machine, is provided a pair of elevators 13 and 14, which consist of a pair of inclined troughs in which run the carrier chains c, provided with suitable tongues or fingers for engaging the fruit and moving it up the elevator. The elevators discharge onto a table or platform 15 by means of which the fruit may be conveyed elsewhere. The elevators are driven by means of a sprocket chain 16 running over sprocket pulleys 17 on the shaft 17ᵃ at the lower end of the elevators and 18 mounted on a main driving shaft 9.

The fruit is fed into the machine from a table or chute 19, located at the entrance end of the wash tank. The washing fluid may be supplied to the tank by pipe 20 and discharged from it by means of a pipe 21 at the delivery end of the washer.

The operation of the device is substantially as follows: The tank 1 is filled with water or other suitable washing fluid, so as to nearly or entirely cover the cylinder 2; the machine then being put into operation by means of power applied to shaft 9; the fruit is fed into the end of the tank from the chute or platform 19, and settles into the water, (it will be borne in mind that most fruits upon which the machine will operate, will float in water or the washing fluid). As a sufficient quantity is received into the receiving end of the tank, they will settle into the fluid and pass through the opening in the partition 11 and enter the cylinder where they will be rolled and rubbed upon one another and upon the surface of the cylinder, thus removing all foreign matter from the skins of the fruit. At the same time they are gradually forced through the cylinder by the internal spiral projections therein as well as by the quantity of floating fruit. When the fruit has been passed entirely through the cylinder 2 and to the outside of the partition 12 it floats on top of the washing fluid to the elevators 13 and 14 by the moving chains on which the several articles of fruit are caught as they come within range and are passed by the elevator and delivered onto the table 15. In case the fruit does not float, they will be forced into range of the elevators by the excessive weight of fruit at the entrance end of the washer.

The modified forms of cylinders shown in Figs. 6, 7, 8 and 9 are adapted for use with fruits of varying density as well as fruit requiring more or less washing.

In the use of the cylinder 6, the large end would be the entrance end and the small end the discharge end, and the fruit would be forced through the cylinder by the weight of the accumulated fruit at the receiving end.

In the use of the cylinder shown in Fig. 7, the small end would be the receiving end and the large end the discharge end and the fruit would be passed through the cylinder by its buoyant tendency acting on the upper inclined surface of the cylinder.

By use of the cylinder shown in Figs. 8 and 9, the same results as described with reference to Figs. 6 and 7 was obtained by inclining the axis of the cylinder.

What I claim as new, and desire to secure by Letters Patent, is—

1. In a fruit washing machine, a washing fluid tank, a rotatable cylinder open at each end mounted in the tank, partitions in the tank at either end of the cylinder having submerged openings coinciding with the open ends of the cylinder and dividing the tank into three divisions, substantially as set forth.

2. In a fruit washing machine, a washing fluid tank and a rotatable cylinder located below the upper edge of the tank whereby it can be entirely submerged in the washing fluid, substantially as set forth.

3. In a fruit washing machine, a washing fluid tank, a rotatable cylinder having open ends located in the tank, and a delivery elevator extending into the tank below the washing fluid level and reaching above the tank, substantially as set forth.

In witness whereof I have affixed my signature in presence of two witnesses.

SAMUEL CAMPBELL WARNER.

Witnesses:
GEORGE C. CARTER,
MARY A. KELLER.